(12) United States Patent
Clamme

(10) Patent No.: US 9,331,558 B2
(45) Date of Patent: May 3, 2016

(54) VIBRATION TRANSDUCER AND ACTUATOR

(71) Applicant: Marvin L. Clamme, New Knoxville, OH (US)

(72) Inventor: Marvin L. Clamme, New Knoxville, OH (US)

(73) Assignee: The Guitammer Company, Westerville, OH (US)

( * ) Notice: Subject to any disclaimer, the term of this patent is extended or adjusted under 35 U.S.C. 154(b) by 268 days.

(21) Appl. No.: 13/653,035

(22) Filed: Oct. 16, 2012

(65) Prior Publication Data

US 2013/0106205 A1    May 2, 2013

Related U.S. Application Data

(60) Provisional application No. 61/627,636, filed on Oct. 17, 2011.

(51) Int. Cl.
| | |
|---|---|
| *H02K 33/02* | (2006.01) |
| *H01F 7/10* | (2006.01) |
| *H01F 7/16* | (2006.01) |
| *H04R 13/00* | (2006.01) |

(52) U.S. Cl.
CPC ............... *H02K 33/02* (2013.01); *H01F 7/10* (2013.01); *H01F 7/1646* (2013.01); *H04R 13/00* (2013.01)

(58) Field of Classification Search
CPC .......... H04R 13/00; H04R 13/02; H02K 33/10
USPC ............................................ 335/229
See application file for complete search history.

(56) References Cited

U.S. PATENT DOCUMENTS

| | | | | |
|---|---|---|---|---|
| 3,873,784 | A * | 3/1975 | Doschek | 381/186 |
| 4,701,647 | A * | 10/1987 | Dean et al. | 310/29 |
| 6,751,334 | B2 * | 6/2004 | Hakansson | 381/396 |
| 7,069,787 | B2 | 7/2006 | Crowson, II | |
| 2003/0012395 | A1 * | 1/2003 | Fukuda | 381/380 |
| 2004/0028254 | A1 * | 2/2004 | Bachmann et al. | 381/412 |
| 2004/0169989 | A1 * | 9/2004 | Babich | 361/160 |
| 2006/0165246 | A1 * | 7/2006 | Lee et al. | 381/151 |
| 2007/0160238 | A1 * | 7/2007 | Kobayashi | 381/151 |
| 2009/0072636 | A1 * | 3/2009 | Gruden | 310/14 |
| 2012/0082317 | A1 | 4/2012 | Pance et al. | |
| 2014/0185859 | A1 * | 7/2014 | Wilk et al. | 381/412 |

* cited by examiner

*Primary Examiner* — Quyen Leung
*Assistant Examiner* — Eric Johnson
(74) *Attorney, Agent, or Firm* — Ice Miller LLP

(57) ABSTRACT

Disclosed herein are multiple embodiments of a vibration transducer and actuator which combine an upper piece, a lower piece, a permanent magnet, an electromagnet coil, and, in some embodiments, a spring spacer.

7 Claims, 3 Drawing Sheets

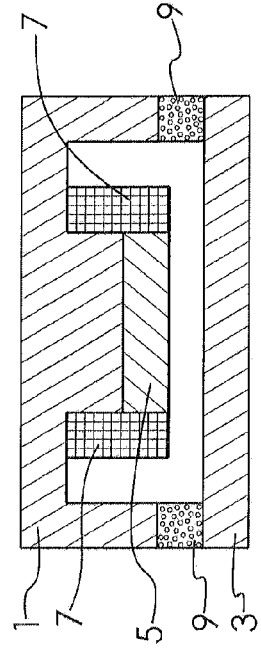
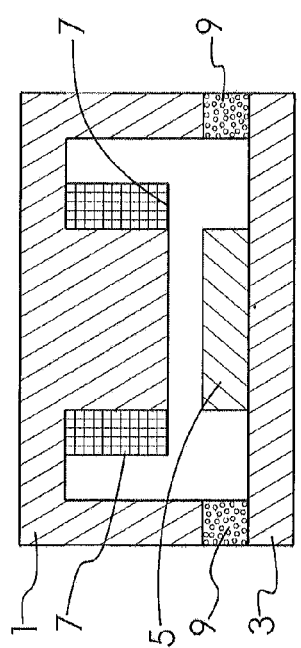
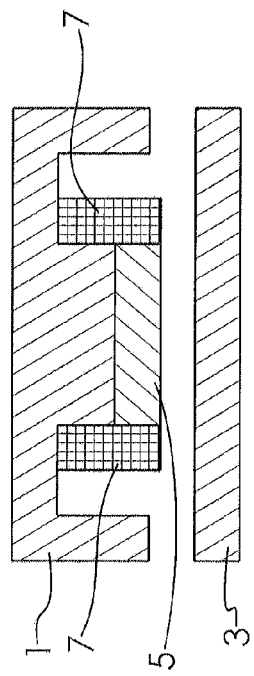
Fig. 5
Fig. 6
Fig. 7

VIBRATION TRANSDUCER AND ACTUATOR

CROSS-REFERENCE TO RELATED APPLICATIONS

The present application claims the benefit of U.S. Provisional Patent Application Ser. No. 61/627,636 filed Oct. 17, 2011 entitled "Vibration Transducer and Actuator" which is hereby incorporated by reference in its entirety.

TECHNICAL FIELD OF THE DISCLOSURE

The present disclosure generally relates to electromagnetic devices and, more particularly, to a vibration transducer and actuator.

BACKGROUND OF THE DISCLOSURE

Electromagnetic vibration (or shaking) transducers and actuators are used in a variety of applications, such as home theater installations, mobile devices such as cellular telephones, active vibration control, active noise control, and many other applications. Different applications require different performance characteristics and size constraints from the vibration device. Although many designs for such devices are known in the art, there is considerable room for improvement in the provision of a vibration device that exhibits high vibratory amplitude from a package that minimizes the space required for the vibration device. The presently disclosed embodiments are designed to meet this need.

SUMMARY OF THE DISCLOSURE

Disclosed herein are multiple embodiments of a vibration transducer and actuator. In one embodiment, a vibration transducer and actuator is disclosed, comprising an upper piece; a lower piece; a permanent magnet disposed between the upper and lower pieces; an electromagnet coil disposed between the upper and lower pieces; and a spring spacer disposed between the upper and lower pieces, the spring spacer having at least one opening formed therein allowing air to move freely therethrough into and out of a space between the upper and lower pieces; wherein the upper and lower pieces are attracted toward one another with an attractive force due to a first magnetic field produced by the permanent magnet; wherein the attraction between the upper and lower pieces causes the spring spacer to compress until a restorative force of the spring spacer balances the attractive force; and wherein activation of the electromagnet coil causes addition or subtraction to the attractive force due to a second magnetic field produced by the electromagnet coil, moving the upper and lower pieces respectively closer together or farther apart, causing air to respectively be expelled from or drawn into the space between the upper and lower pieces through the at least one opening.

In another embodiment, a vibration transducer and actuator is disclosed, comprising a first piece; a second piece, the second piece having at least one opening formed therein allowing air to move freely therethrough into and out of a space between the first and second pieces; a permanent magnet disposed between the first and second pieces; an electromagnet coil disposed between the first and second pieces; and a spring spacer disposed between the first and second pieces; wherein the first and second pieces are attracted toward one another with an attractive force due to a first magnetic field produced by the permanent magnet; wherein the attraction between the first and second pieces causes the spring spacer to compress until a restorative force of the spring spacer balances the attractive force; and wherein activation of the electromagnet coil causes addition or subtraction to the attractive force due to a second magnetic field produced by the electromagnet coil, moving the first and second pieces respectively closer together or farther apart, causing air to respectively be expelled from or drawn into the space between the upper and lower pieces through the at least one opening.

In another embodiment, a device containing a vibration transducer and actuator is disclosed, the device comprising a top surface and a bottom surface defining a cavity therebetween; an upper piece operatively coupled to the top surface; a lower piece operatively coupled to the bottom surface; a permanent magnet disposed between the upper and lower pieces; and an electromagnet coil disposed between the upper and lower pieces; wherein the upper and lower pieces are attracted toward one another with an attractive force due to a first magnetic field produced by the permanent magnet; wherein the top and bottom surfaces deflect to balance the attractive force; and wherein activation of the electromagnet coil causes addition or subtraction to the attractive force due to a second magnetic field produced by the electromagnet coil, moving the upper and lower pieces respectively closer together or farther apart, causing movement of at least one of the top and bottom surface.

Other embodiments are also disclosed.

BRIEF DESCRIPTION OF THE DRAWINGS

FIG. 5 is a cross-sectional view of a fifth embodiment vibration device according to the present disclosure;

FIG. 6 a cross-sectional view of a sixth embodiment vibration device according to the present disclosure;

FIG. 7 a cross-sectional view of a seventh embodiment vibration device according to the present disclosure.

DETAILED DESCRIPTION OF THE VARIOUS EMBODIMENTS

Figure 1:
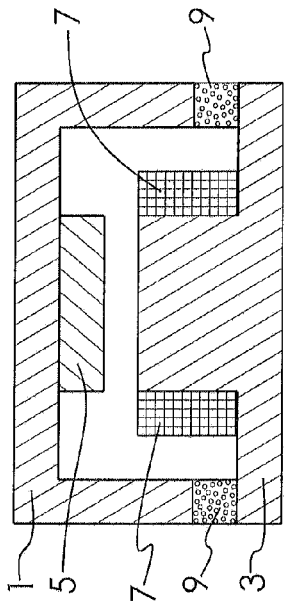
FIG. 1 is a cross-sectional view of a first embodiment vibration device according to the present disclosure.
Figure 2:
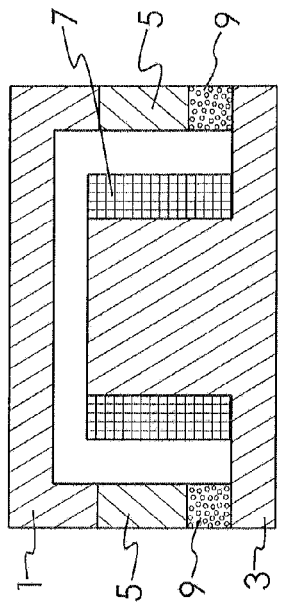
FIG. 2. is a cross-sectional view of a second embodiment vibration device according to the present disclosure.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. A few embodiments of the invention is shown in great detail, although it will be apparent to those skilled in the relevant art that some features that are not relevant to the present invention may not be shown for the sake of clarity.

Referring to FIG. 1, there is shown one embodiment of a vibration device according to the present disclosure. The device is schematically illustrated in cross-section, and it will be appreciated by those skilled in the art that the relative dimensions shown in the drawings are not intended to be to scale, and that variations in sizing will be dictated by different applications, such as required vibratory power, required package size, and the like. The first embodiment device of FIG. 1 includes an upper ferrous piece 1, a lower ferrous piece 3, a magnet 5, a coil 7, and a spacer spring 9.

In the first embodiment, the magnet 5 is attached to the lower ferrous piece 3 by any convenient means. The magnet 5 may be any source of magnetic flux, and in some embodiments comprises a neodymium ($Nd_2Fe_{14}B$) rare-earth permanent magnet. The $Nd_2Fe_{14}B$ crystal structure has exceptionally high uniaxial magnetocrystalline anisotropy and also a high saturation magnetization and therefore the potential for storing large amounts of magnetic energy. Those skilled in the art will recognize that other types of magnets may also be used for the magnet 5. In some embodiments, the upper ferrous piece 1 and the lower ferrous piece 3 are both formed from low carbon steel or other material of sufficient magnetic permeability, which carries the magnetic fields produced by the magnet 5 and/or coil 7, but does not retain it.

The upper ferrous piece 1 in the embodiment of FIG. 1 is located in proximity to the lower ferrous piece 3 and magnet 5 assembly so as to be attracted to that assembly by the magnetic field produced by the magnet 5 and carried by the lower ferrous piece 3. The spacer spring 9 in the embodiment of FIG. 1 maintains the upper ferrous piece 1 spaced apart from the magnet 5 and lower ferrous piece 3. The spacer spring 9 may be formed from any resilient or elastic material, such as rubber, silicone or metal to name just a few non-limiting examples, and is compressed by the magnetic force of the magnet 5 attracting the upper ferrous piece 1 and the lower ferrous piece 3 toward one another, such that the spacer spring 9 is compressed until the spacer spring 9's restoring force is of such magnitude as to counter the magnetic attraction force and therefore maintain a balance between these two forces such that no further compression of the spring spacer 9 will occur. In this state, the spring spacer is under a compression bias that will maintain the spacing between the upper ferrous piece 1 and the lower ferrous piece 3 until the forces between them are changed.

The coil 7 comprises one or more loops of conductor, such as magnet wire, that when an electric current is passed therethrough a magnetic field is formed. The coil 7 is located relative to the magnet 5 and the magnet 5's associated magnetic circuit such that when an electric current is applied to the coil 7, the magnetic field produced by the coil 7 combines with the magnetic field produced by the magnet 5 to either add to, or subtract from, the magnetic field produced by the magnet 5.

When an AC current is applied to the coil 7, the magnetic field produced by the coil 7 combines with the magnetic field produced by the magnet 5 in an additive or subtractive manner, depending on the direction of the current through the coil. The combined total of the two magnetic fields varies around the static magnetic field produced by the magnet 5 alone, and the attraction of the upper ferrous piece 1 to the lower ferrous piece 3 varies with the varying magnetic field strength. The spacer spring 9 compresses further with additive magnetic field strength, drawing the ferrous pieces 1, 3 closer together, while the restoring force of the spring spacer 9 pushes the ferrous pieces 1, 3 farther apart with subtractive magnetic field strength or when the current in the coil 7 is removed. This allows a controlled variable distance between the ferrous pieces 1, 3 depending on the magnitude and polarity of the current in the coil 7.

In some embodiments, the vibration transducer and actuator is symmetrical, while in other embodiments it is axially symmetrical. Other embodiments display other arrangements.

Figure 3:
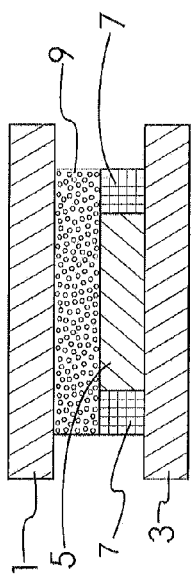
FIG. 3. is a cross-sectional view of a third embodiment vibration device according to the present disclosure.
Figure 4:
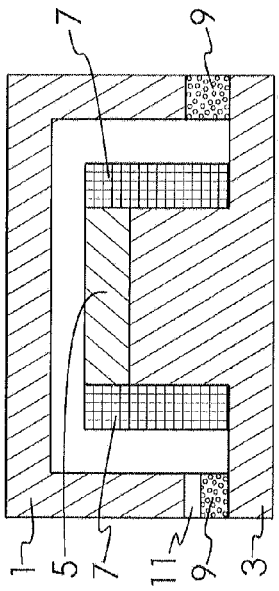
FIG. 4. a cross-sectional view of a fourth embodiment vibration device according to the present disclosure.
Figure 8:
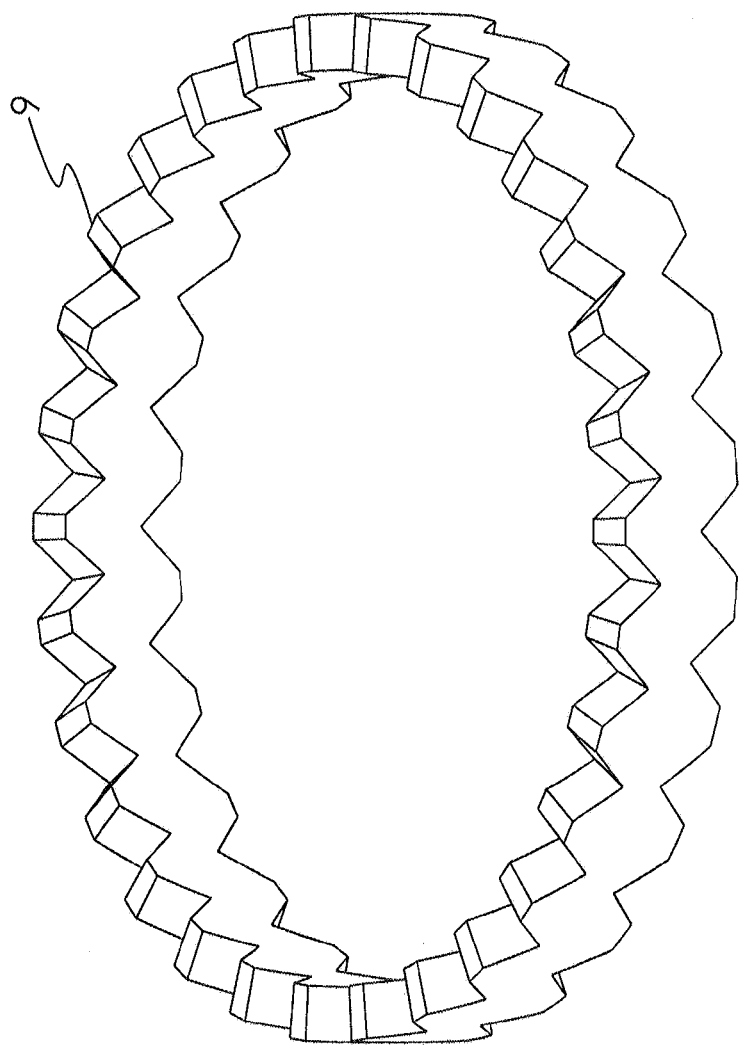
FIG. 8 is a perspective view of one embodiment of a spring spacer having notches formed therein according to the present disclosure.

The embodiments illustrated in FIGS. 2-7 show only several of many other possible arrangements of the various components discussed above. FIG. 8 shows one alternative embodiment for an annular spacer spring 9 such as those shown in FIGS. 2-5. With the spacer spring 9 as illustrated in FIG. 8, when the upper and lower ferrous pieces 1, 3 are compressed or pushed farther apart, the air pressure inside the vibration transducer and actuator is respectively increased and decreased and openings (such as the notches illustrated in FIG. 8 or channels, if not formed at the periphery) formed in the spacer spring 9 of FIG. 8 allow air flow out of and into the interior of the vibration transducer and actuator in order to equalize this pressure and increase the efficiency of the unit. It will be appreciated from the above description that the openings may be made in any desired shape and may be provided in any desired number, from a single opening to a plurality of openings. Alternatively or additionally, either or both of the upper and lower ferrous pieces 1, 3 may be may be provided with at least one opening or channel 11 (as shown in FIG. 3) for air to be equalized at the ferrous pieces 1, 3 are compressed or pushed farther apart. It will be appreciated from the above description that the channel 11 may be formed at the periphery of either that ferrous piece 1 and/or 3 as shown in FIG. 3, or the channel 11 may be formed at another location in the ferrous pieces 1 and/or 3.

As an example of use of the vibration transducer and actuator embodiments disclosed herein, one of the two ferrous pieces 1, 3 may be attached to a panel, whereby the other ferrous piece may be used as an inertial mass acting upon the panel in concert with application of an electric current to the coil 7. This allows the electric current to control movement of the panel in a vibratory manner for any desired purpose, such as shaking material inside a container, using the panel to move air to act as a speaker, or any other desired purpose. Additionally, each ferrous piece 1, 3 may be attached to adjacent solid surfaces, and the distance between the solid surfaces may be controlled by the current applied to the coil 7.

In some embodiments, such as that shown in FIG. 7, the spacer spring 9 may be eliminated. In these embodiments, the spacing and spring functions may be supplied by the relative positions of two external mechanical components to which the upper ferrous piece 1 and the lower ferrous piece 3 are respectively attached. Application of a current to the coil 7 acts to control the relative distance between the two components. As a non-limiting example, the two mechanical components may comprise the top surface and bottom surface of a cavity in a case of a laptop computer into which the vibration transducer and actuator is mounted. Application of electric current to the coil 7 may therefore be used to create a vibratory force in the case, for example to augment an audible sound produced by the computer. Many other similar installations are also possible and will be appreciated by those skilled in the art in view of the above described embodiments.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected. It is also contemplated that structures and features embodied in the present examples can be altered, rearranged, substituted, deleted, duplicated, combined, or added to each other. The articles "the", "a" and "an" are not necessarily limited to mean only one, but rather are inclusive and open ended so as to include, optionally, multiple such elements.

What is claimed:

1. A vibration transducer and actuator, comprising:
   an upper piece;
   a lower piece;
   a permanent magnet disposed between the upper and lower pieces;
   an electromagnet coil disposed between the upper and lower pieces; and
   a spring spacer disposed between the upper and lower pieces and including a continuous surface extending around its perimeter between a first edge adjacent the upper piece but not the lower piece and an opposite second edge adjacent the lower piece but not the upper piece, the spring spacer having a first plurality of openings formed in the first edge and a second plurality of openings formed in the second edge, the first and second plurality of openings allowing air to move freely therethrough into and out of a space between the upper and lower pieces;
   wherein the upper and lower pieces are attracted toward one another with an attractive force due to a first magnetic field produced by the permanent magnet;
   wherein the attraction between the upper and lower pieces causes the spring spacer to compress until a restorative force of the spring spacer balances the attractive force; and
   wherein activation of the electromagnet coil causes addition or subtraction to the attractive force due to a second magnetic field produced by the electromagnet coil, moving the upper and lower pieces respectively closer together or farther apart, causing air to respectively be expelled from or drawn into the space between the upper and lower pieces through the at least one opening.

2. The vibration transducer and actuator of claim 1, wherein the permanent magnet comprises a rare-earth magnet.

3. The vibration transducer and actuator of claim 2, wherein the rare-earth magnet comprises a neodymium magnet.

4. The vibration transducer and actuator of claim 1, wherein the upper piece and the lower piece are formed from a ferrous metal.

5. The vibration transducer and actuator of claim 4, wherein the ferrous metal is low-carbon steel.

6. The vibration transducer and actuator of claim 1, wherein the spring spacer is formed from a material selected from the group consisting of: rubber, silicone and metal.

7. The vibration transducer and actuator of claim 1, wherein the electromagnet comprises one or more loops of wire.

* * * * *